Patented Mar. 3, 1942

2,275,225

UNITED STATES PATENT OFFICE 2,275,225

MILK CUSTARD BEVERAGE

Wilbert H. Hubbell, Washington, D. C.

No Drawing. Application April 18, 1939,
Serial No. 268,573

2 Claims. (Cl. 99—54)

This invention relates to food products and, particularly, a liquid to be used as a beverage, and the method of producing the same.

The primary object of the invention is to provide a beverage, preferably described as a milk custard beverage which, while of custard-like characteristics, is produced in liquid form, so as to be consumed in the form of a beverage.

Another object is to provide a beverage consisting essentially of milk and eggs which may be kept, without becoming rancid, over extended periods of time and in which there will be no precipitation or separation of the solids from the liquid in the custard.

A still further object is to produce a milk custard beverage by a method wherein the eggs and milk, in liquid form, are thoroughly and uniformly mixed without incorporating extraneous air or oxygen, whereby the resulting beverage will not become rancid when kept under proper refrigerating conditions.

A still further object is to produce a milk custard beverage by a method wherein the milk and eggs, in liquid form, are heated to partially coagulate the serum solids so as to increase the viscosity of the liquid mix to the desired point, but without raising the temperature of the mix to the boiling point, thus preventing that degree of coagulation or viscosity which would result in what might be called a boiled custard. In other words, the present product retains substantially its original liquid consistency or characteristic, so that it may be properly called a beverage.

As indicated, the present product is truly a beverage in the sense that it is liquid and is consumed as a drink and, in carrying out the present invention, therefore, there are two factors requiring care in the preparation of the product. First, care must be taken to prevent the incorporation of air or oxygen which, as is well understood, would result in the liquid product becoming rancid in a comparatively short period of time. Secondly, it is preferred that the product have a somewhat greater degree of viscosity than normal liquid milk but, in treating the present mixture for the purpose of partially coagulating the serum solids therein, care must be taken to not raise the temperature above the boiling point or, otherwise, the product will completely lose its liquid characteristics and more nearly resemble what might be termed boiled custard.

The preferred manner of producing the present beverage consists, first, in adding fresh, uncooked eggs to liquid milk. Either whole or skim milk may be used, the only essential being that it shall be in liquid form. The eggs are added in a quantity of approximately one part eggs to six parts milk, by weight, and in actual practice, I have found that ten (10) eggs to a gallon of milk produces the best results. Preferably, the eggs are first beaten to mix them up well, but care should be taken not to whip them to an extent where they will become aerated or take up extraneous air. The eggs, thus prepared, are added to the milk which, of course, should be pasteurized, and the mix stirred to uniformly distribute the eggs throughout the milk—a stage which can be rather readily determined by the uniform yellowish color of the mixture. During, or immediately after, the mixing of these two ingredients, the liquid mix is heated to cause partial coagulation of the serum solids and the egg content with the result that these two elements will combine to form permanently bonded globules or particles. During the agitation and heating of the mixture, care should also be exercised so as to not too violently agitate the mix. In other words, it is again essential that there be no whipping or aerating of the mixture. Extraneous air is thus excluded and the length of time over which the beverage can be kept without becoming rancid will be materially prolonged. The degree of heating or coagulation of the milk solids and egg content is somewhat optional depending upon the degree of viscosity desired in the finished beverage. It is, of course, necessary that the mixture be heated above pasteurizing temperature, or approximately 150° F., but it is important that the temperature thereof be not raised above the boiling point, or 212° F. In actual practice, it has been found that the best results are secured where the mixture is heated to 200° F. A mix, in the proportions stated, and heated to a temperature of 200° F., will be found to have a rather creamy taste, but not to heavy, thus making a very palatable taste, much more pleasing than that of ordinary milk.

Flavoring materials are, of course, incorporated in the mix, these flavoring materials consisting, for instance, of sugar and vanilla flavoring. They may be added during the mixing or agitation of the milk and eggs, or after that step has been performed, but they should be added while the mixture is maintained at the highest temperature employed in effecting the partial coagulation of the milk solids. Care should be taken that the sugar is thoroughly dissolved. In a batch such as above indicated, i. e., consisting of a gallon of milk and approximately twenty

(20) ounces of fresh eggs, which is the weight of ten (10) average eggs, good results have been obtained with the use of five (5) ounces of sugar and twenty (20) cc. of pure vanilla flavoring extract. After the vanilla and sugar have been added, and, preferably, immediately afterwards, the mix is cooled to at least a temperature below 60° F. and, preferably, to 45° F. The beverage is then ready for bottling or consumption.

It will be appreciated that the liquid or beverage product will not remain stable under all climatic conditions, particularly where higher temperatures prevail, and, in accordance with the usual practice for preserving food products, the present beverage should be kept under proper refrigerating conditions. A beverage prepared in accordance with the above procedure, when kept in the usual household refrigerator, will not develop a rancid condition for a period of days, usually as long as one to two weeks. It has also been observed that over such a period of time, there will be no precipitation of solid matter from the liquid content of the beverage. As stated, the product is strictly a liquid for beverage purposes and is totally unlike the ordinary boiled custard or frozen custard. It provides an equally balanced drink and contains high nutritional values containing, as it does, vitamins A, B, D, E, F (or $B_1$) and G (or $B_2$).

What I claim is:

1. The method of producing a substantially stable milk custard beverage which consists in adding unaerated raw eggs to liquid milk in proportions of approximately one part eggs to six parts milk, by weight, agitating and uniformly mixing said ingredients without aeration and heating said mixture to a temperature not substantially exceeding approximately 200° F. without boiling, adding flavoring ingredients, and then immediately reducing the temperature to approximately 45° F.

2. The method of producing a substantially stable milk custard in liquid form for beverage purposes which consists in adding uncooked eggs to liquid milk and agitating the mixture to uniformly mix said ingredients while heating the mixture at normal or atmospheric pressure to partially coagulate the serum solids therein, the temperature of the mix being maintained below 212° F. and the agitation being such as to minimize aeration of the mix, adding flavoring materials to the mix, and then reducing the temperature of the mix to less than 60° F.

WILBERT H. HUBBELL.